(12) United States Patent
Terris et al.

(10) Patent No.: US 8,458,486 B2
(45) Date of Patent: Jun. 4, 2013

(54) PROBLEM-BASED ACCOUNT GENERATION

(75) Inventors: Benjamin Samuel Terris, Tucson, AZ (US); Richard Albert Welp, Tucson, AZ (US); Robin Daniel Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 12/903,605

(22) Filed: Oct. 13, 2010

(65) Prior Publication Data

US 2012/0096279 A1 Apr. 19, 2012

(51) Int. Cl.
*G06F 21/00* (2006.01)

(52) U.S. Cl.
USPC .......................................................... 713/184

(58) Field of Classification Search
None
See application file for complete search history.

(56) References Cited

U.S. PATENT DOCUMENTS

| | | | |
|---|---|---|---|
| 7,257,713 | B2 | 8/2007 | Colvig et al. |
| 7,401,149 | B2 | 7/2008 | Davis, III et al. |
| 2006/0277595 | A1 | 12/2006 | Kinser et al. |
| 2008/0096507 | A1 | 4/2008 | Erola |
| 2008/0256387 | A1 | 10/2008 | Butt et al. |
| 2009/0083272 | A1 | 3/2009 | Li et al. |
| 2009/0119119 | A1 | 5/2009 | Scalisi et al. |
| 2009/0276840 | A1 | 11/2009 | Cao et al. |
| 2009/0288149 | A1 | 11/2009 | Kolluru et al. |
| 2010/0100941 | A1 | 4/2010 | Eom et al. |
| 2011/0307544 | A1* | 12/2011 | Lotlikar et al. ............... 709/203 |

OTHER PUBLICATIONS

Pereira et al.; "Role-Based Access Control for Grid Database Services Using the Community Authorization Service", IEEE Transactions on Dependable and Secure Computing, vol. 3, No. 2, Apr.-Jun. 2006.
Chowdhury et al., "Distributed Identity for Secure Service Interaction", IEEE, Proceedings of the Third International Conference on Wireless and Mobile Communications, 2007.
Wonohoesodo et al.; "A Role Based Access Control for Web Services", Proceedings of the 2004 IEEE International Conference on Services Computing, 2004.

* cited by examiner

*Primary Examiner* — Brandon Hoffman
(74) *Attorney, Agent, or Firm* — Nelson and Nelson; Daniel P. Nelson; Alexis V. Nelson

(57) ABSTRACT

A method to provide problem-based access to a computing device is disclosed herein. In one embodiment of the invention, such a method includes detecting a problem on a computing device. The method automatically generates a user account on the computing device in response to detecting the problem. The problem is then tied to the user account. A support provider is then notified of the problem and the user account associated with the problem. This user account may be assigned to a service technician to enable access to the computing device. The service technician may then log into the computing device using the user account and address the problem. A corresponding apparatus and computer program product are also disclosed herein.

25 Claims, 6 Drawing Sheets

PROBLEM-BASED ACCOUNT GENERATION

BACKGROUND

1. Field of the Invention

This invention relates to apparatus and methods for controlling access to computing systems, such as servers and storage systems.

2. Background of the Invention

In today's service environment, many systems are implemented with a single pre-defined service account that provides access to a machine. A password is typically established to log into such an account. This does not provide a high degree of security as passwords are often shared across product lines and service personnel. Such passwords may also not be changed for a significant amount of time. This provides an avenue of attack for hackers who may come across the user account and password or can enable former employees to access systems without authorization. Frequently changing passwords can also be problematic as new passwords may need to be communicated to appropriate service personnel. This can be time a consuming process and create a management headache.

In many service environments, the customer owns the equipment and has control over the user accounts and passwords. This can create problems where technical support is provided by an external party, such as a product vendor or third party. Allowing the customer to control the user accounts and passwords has the disadvantage that it often requires customer intervention to gain access (either on-site or remote access) to the customer's equipment. This can lead to unnecessary delays when providing support, potentially causing outages and service delays that are longer than necessary.

In view of the foregoing, what are needed are apparatus and methods to more effectively manage user accounts and passwords on computing products, such as servers, storage devices, and other computing hardware. Further needed are apparatus and methods to prevent unauthorized access to such computing products by hackers, former employees, or other individuals. Ideally, such apparatus and methods would require little if any intervention from the owners of the computing products.

SUMMARY

The invention has been developed in response to the present state of the art and, in particular, in response to the problems and needs in the art that have not yet been fully solved by currently available apparatus and methods. Accordingly, the invention has been developed to provide apparatus and method to provide problem-based access to computing devices, such as servers, storage systems, and the like. The features and advantages of the invention will become more fully apparent from the following description and appended claims, or may be learned by practice of the invention as set forth hereinafter.

Consistent with the foregoing, a method to provide problem-based access to a computing device is disclosed herein. In one embodiment of the invention, such a method includes detecting a problem on a computing device. The method automatically generates a user account on the computing device in response to detecting the problem. The problem is then tied to the user account. A support provider is then notified of the problem and the user account associated with the problem. This user account may be assigned to a service technician to enable access to the computing device. The service technician may then log into the computing device using the user account and address the problem.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
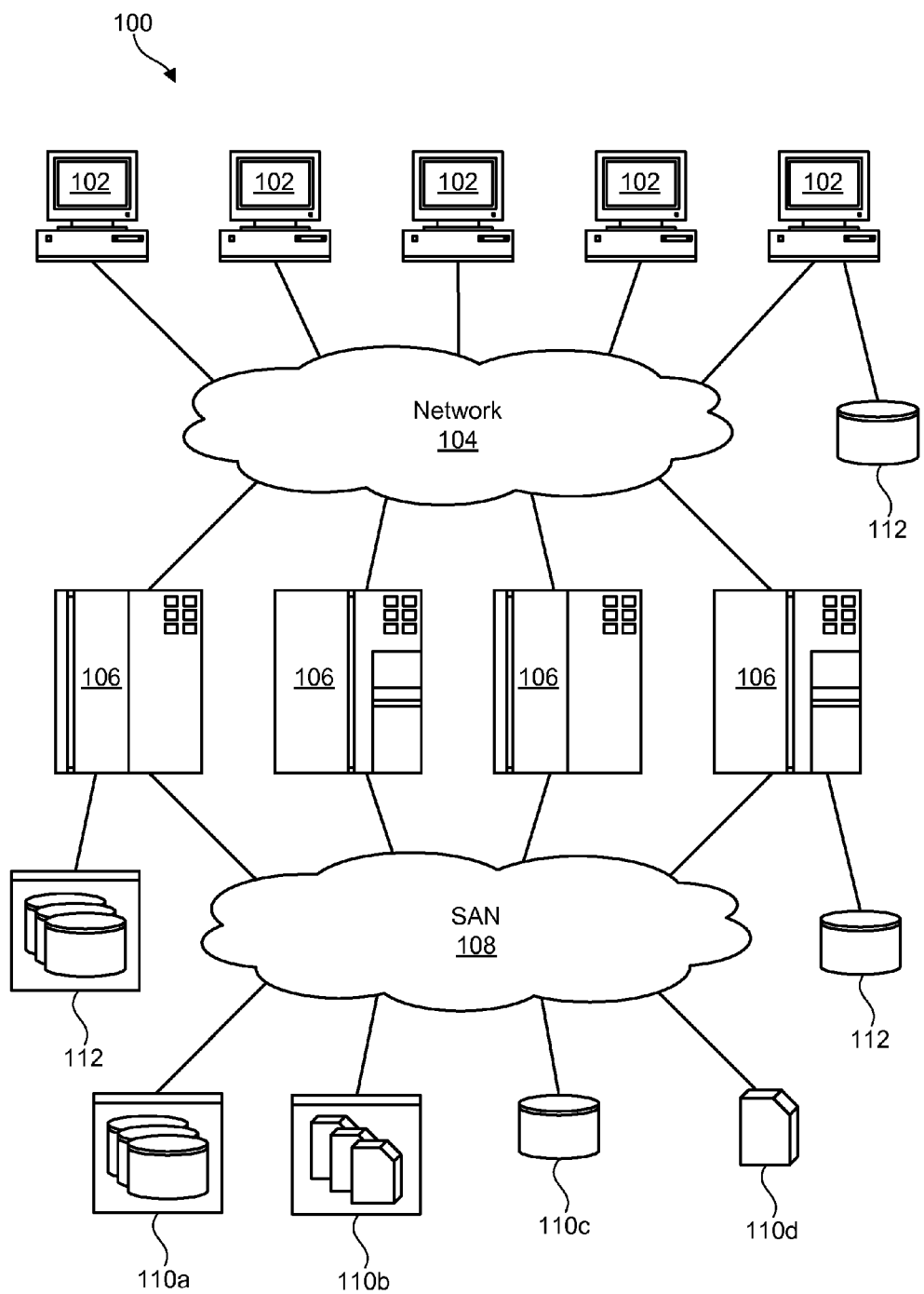
FIG. 1 is a high-level block diagram showing one example of a network environment made up of different types of computing devices.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show various type of computing devices that may benefit from the apparatus and methods disclosed herein. The network architecture 100 is presented only by way of example and is not intended to be limiting. Indeed, the apparatus and methods disclosed herein may be applicable to a wide variety of different computing devices and is not limited to those illustrated herein.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, virtual tape libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
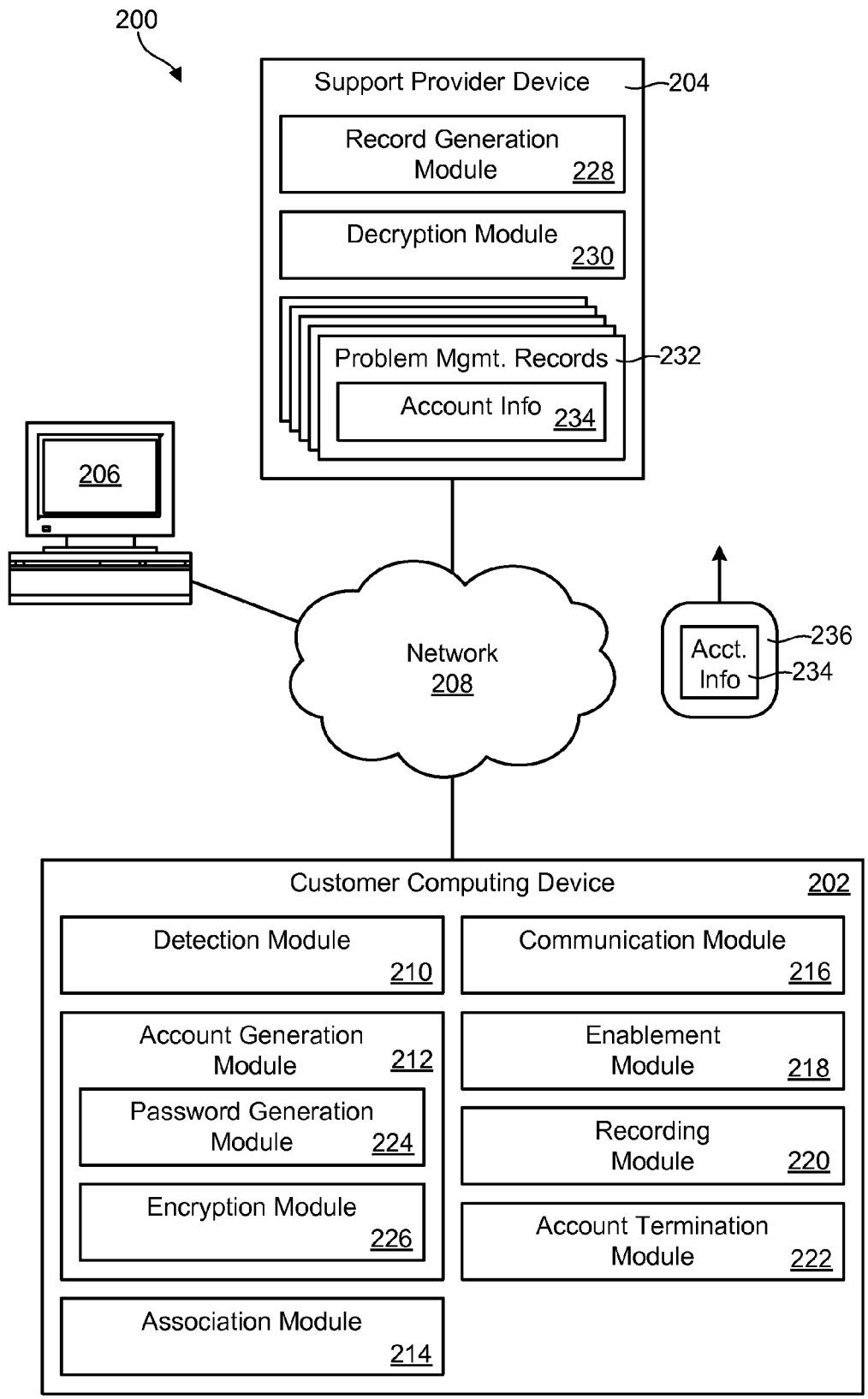
FIG. 2 is a high-level block diagram showing one embodiment of a system for providing problem-based access to a computing device.

Referring to FIG. 2, one embodiment of a system 200 for providing problem-based access to a computing device 202 is illustrated. The computing device 202 may include a server 106, a storage system 110, 112, a personal computer 102, a workstation 102, or other computing device, such as those illustrated in FIG. 1. As shown, the computing device 202 includes one or more modules to provide problem-based access to the computing device 202. These modules may include one or more of a detection module 210, an account generation module 212, an association module 214, a communication module 216, an enablement module 218, a recording module 220, and an account termination module 222.

The detection module 210 is configured to detect a problem on the computing device 202 or related to the computing device 202. For the purposes of this description, a "problem" may include various types of errors or other unexpected or undesirable conditions. Once a problem is detected, the account generation module 212 generates a user account on the computing device 202. The account generation module 212 includes both a password generation module 224 and an encryption module 226. The password generation module 224 generates a password for the user account. This password may be generated randomly or in accordance with some predefined algorithm. The encryption module 226 encrypts the password so the password can be securely transmitted to a support provider 204.

An association module 214 ties the problem to the newly generated user account. In selected embodiments, the problem is uniquely tied to the user account meaning there is a one-to-one correlation between a problem and user account. In other embodiments, multiple problems, such as multiple related problems, may be assigned to the same user account. This may allow the multiple related problems to be assigned to the same technician and addressed together as opposed to individually.

Once the problems have been tied to the user account, a communication module 216 communicates the problem to a support provider 204, such as a vendor of the computing device 202, or a third party employed to provide technical support for the computing device 202. Communication 236 may occur over a network 208, such as the Internet, a private network, a wide-area-network (WAN), a dial-up connection over a modem, or the like. The communication 236 may include the user account information 234 including the encrypted password previously discussed. The communication 236 may also include information needed to analyze and/or resolve the problem, such as traces, dump files, logs, files, and/or hardware or code configuration settings.

At or near the time the communication 236 is sent, an enablement module 218 enables remote management capabilities for the computing device 202. This will allow a service technician 206 to log into and access the computing device 202 from a remote location. For example, the enablement module 218 may enable a feature such as the Tivoli Assist-On-Site feature to allow a technician 206 to access the computing device 202 from a remote location.

Upon receiving the communication 236 at the support provider 204, a record generation module 228 generates a problem management record 232 associated with the problem. The user account information associated with the problem may be stored in the problem management record 232. This problem management record 232 may be assigned to a service technician 206 so that he or she can access the computing device 202 and address the problem. A decryption module 230 may be provided to decrypt the password. While addressing the problem, a recording module 220 may record all service actions that are performed by the technician 206 to solve problem.

Once the problem is solved, the assigned service technician 206 may close the problem management record 232 associated with the problem. When the problem management record 232 is closed, an account termination module 222 terminates the user account on the computing device 202. The remote management capabilities may be disabled at this time. Upon closing the account, a package documenting all service actions performed to solve the problem (as recorded by the recording module 220) may be generated and sent to the support provider 204. This package may be used by the support provider 204 for record keeping, training, and/or evaluation purposes.

The problem-based user account described above not only provides a mechanism for controlling access to the computing device 202, based on a problem event, but also acts as a repository for recording service actions taken to address the problem. Once a problem is solved and the user account closed, access to the computing device 202 by way of the user account and password is terminated. This will prevent hackers, former employees, or other unauthorized users from accessing the computing device 202 using the user account and password.

If the event the problem management record 232 associated with a problem is re-opened, the user account and password may be re-enabled. In such a case, a technician may again have access to the computing device 202 until the problem is solved, and the problem management record 232 and user account are closed. In certain embodiments, if no activity is detected for a problem management record 232 over a specified period of time, the user account and password are automatically disabled. This will reduce unauthorized access by preventing user accounts from remaining active for long periods of time. In certain embodiments, the period of inactivity that will trigger disabling of an account is configurable by a customer.

It should be noted that the modules illustrated in FIG. 2 may be implemented in hardware, software or firmware executable on hardware, or a combination thereof. The modules are presented only by way of example and are not intended to be limiting. Indeed, alternative embodiments may include more or fewer modules than those illustrated. It should also be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in the computing device 202 may actually be implemented in the support provider device 204 and vice versa. Other modules may be spread across multiple devices instead of being contained in a single device. Thus, the location of the modules is presented only by way of example and is not intended to be limiting.

Figure 3:
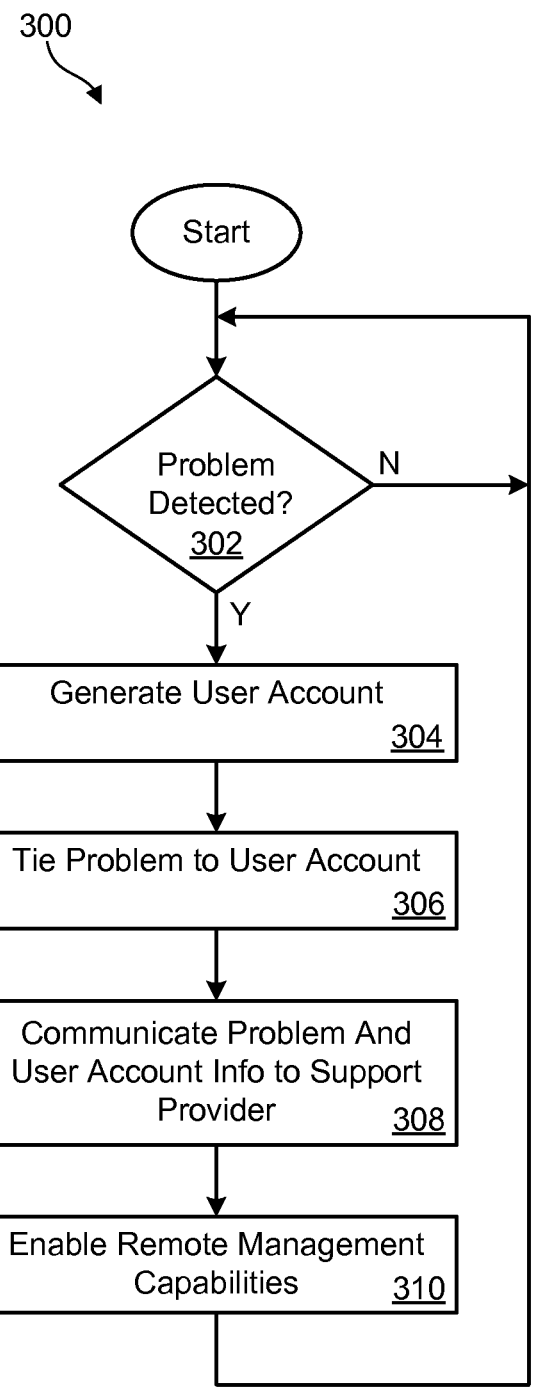
FIG. 3 is a flow diagram showing one embodiment of a method for providing problem-based access to a computing device.

Referring to FIG. 3, one embodiment of a method 300 for providing problem-based access to a computing device is illustrated. This method 300 may be implemented by a computing device 202. As shown, the method 300 initially determines 302 whether a problem has occurred on the computing device 202. If a problem has occurred, the method 300 generates 304 a user account on the computing device 202. This may include generating a password as well as encrypting the password for transmission to a support provider 204. The method 300 then ties 306 the problem to the user account and communicates 308 the problem and user account information to the support provider 204. The method 300 also enables 310 remote management capabilities to enable a technician to service the problem from a remote location.

Figure 4:
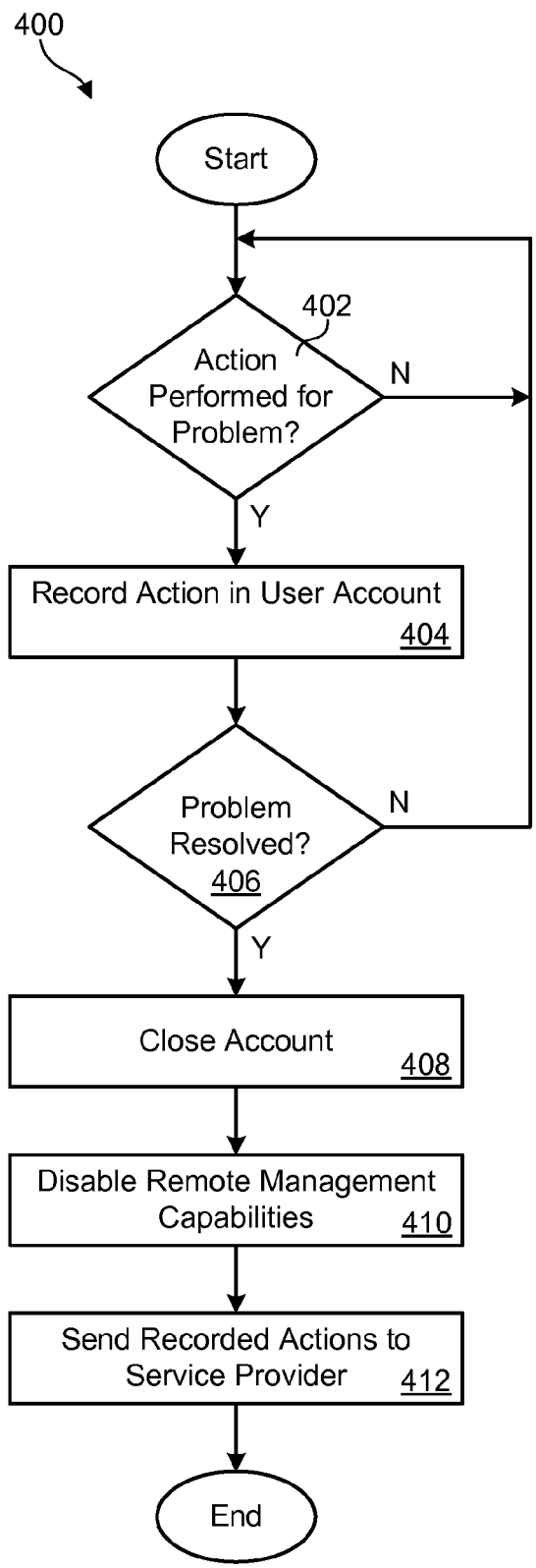
FIG. 4 is a flow diagram showing one embodiment of a method for recording actions performed for a problem tied to a user account.

Referring to FIG. 4, one embodiment of a method 400 for recording actions performed for a problem associated with a user account is illustrated. As shown, once a user account is created, the method 400 determines 402 whether an action has been taken in association with the problem. If so, the method 400 records 404 the action in the user account associated with the problem. This process may continue until the problem is resolved. Once the problem is resolved, as determined at step 406, the method 400 closes 408 the user account associated with the problem. This will prevent unauthorized access of the computing device 202 by way of the user account and password. The method 400 also disables 410 remote management capabilities that were granted to solve the problem. The method 400 then sends 412 the recorded actions to the support provider 204 for record keeping, training, and/or evaluation purposes.

Figure 5:
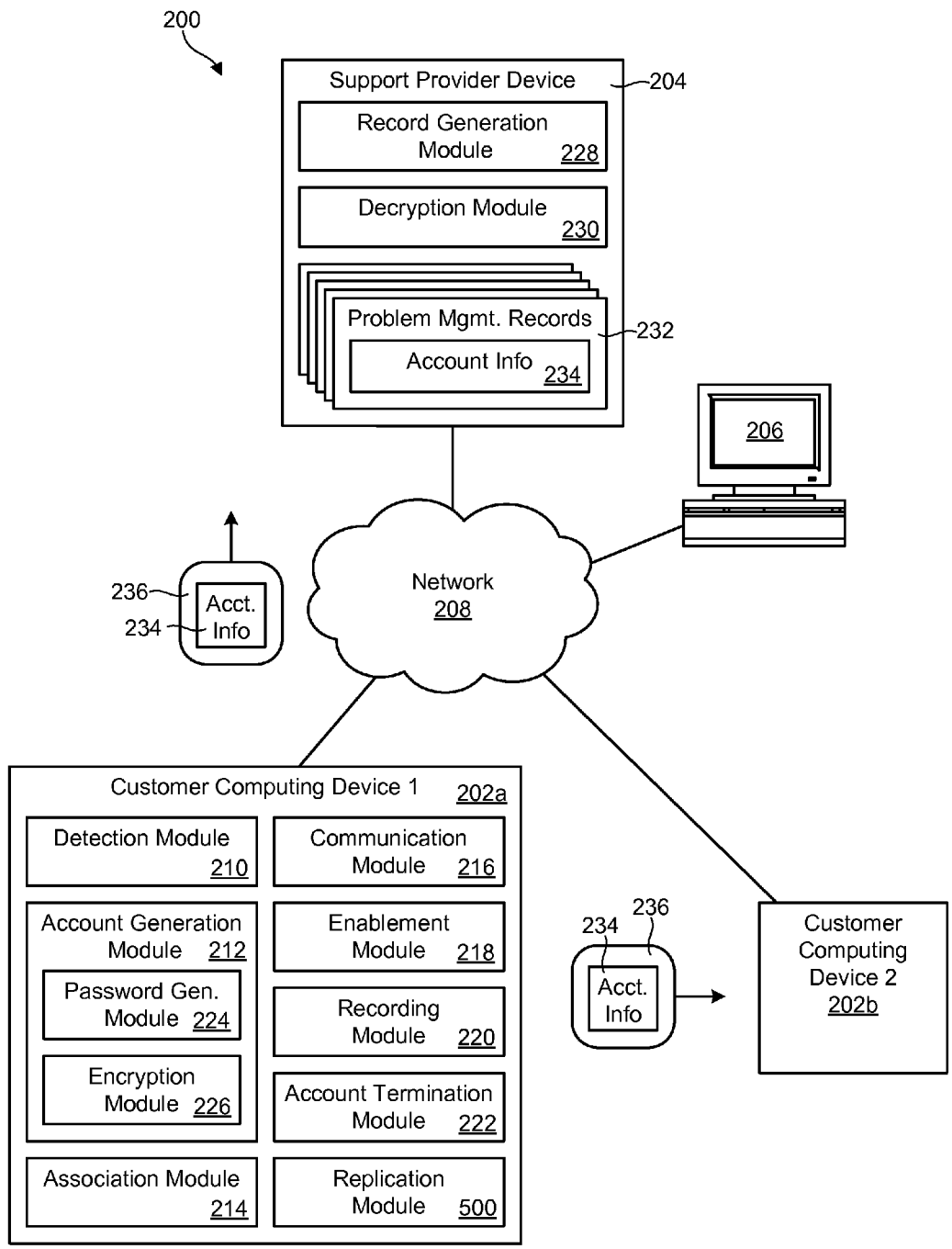
FIG. 5 is a high-level block diagram of an embodiment of a system for providing problem-based access to multiple computing devices.

Referring to FIG. 5, an alternative embodiment of a system 200 for providing problem-based access to a computing device is illustrated. In this embodiment, a customer computing device 202a includes a replication module 500 in addition to the other modules previously discussed. This replication module 500 may be used in situations where problems involve multiple computing devices 202, or computing devices 202 interact with a computing device 202 where a problem occurred. If a problem is detected on a computing device 202a, a user account is generated on the computing device and the account information 234 is sent to the support provider 204 in the manner previously described. If the problem is related to other computing devices—e.g., the problem involves an interaction between several computing devices 202 or other computing devices 202 contain information or need to be modified to resolve the problem—the account information 234 may also be replicated to the other computing devices 202.

For example, as shown in FIG. 5, if a problem occurring on a first computing device 202a involves a second computing device 202b, account information 234 is replicated from the first computing device 202a to the second computing device 202b. This allows the second computing device 202b to establish a user account and password to enable access thereto. In certain embodiments, the problem management record 232 associated with the problem identifies each of the computing devices 202 associated with the problem, as well as the user accounts and passwords for each computing device 202. In selected embodiments, the user account and password generated on each related computing device 202 is the same since they are all tied to the same problem. A technician 206 can then access each of the computing devices 202 associated with the problem, possibly using the same user accounts and passwords. When the problem is resolved, the problem management record 232 associated with the problem is closed and the user accounts on the multiple computing devices 202 are closed in the manner previously described.

Figure 6:
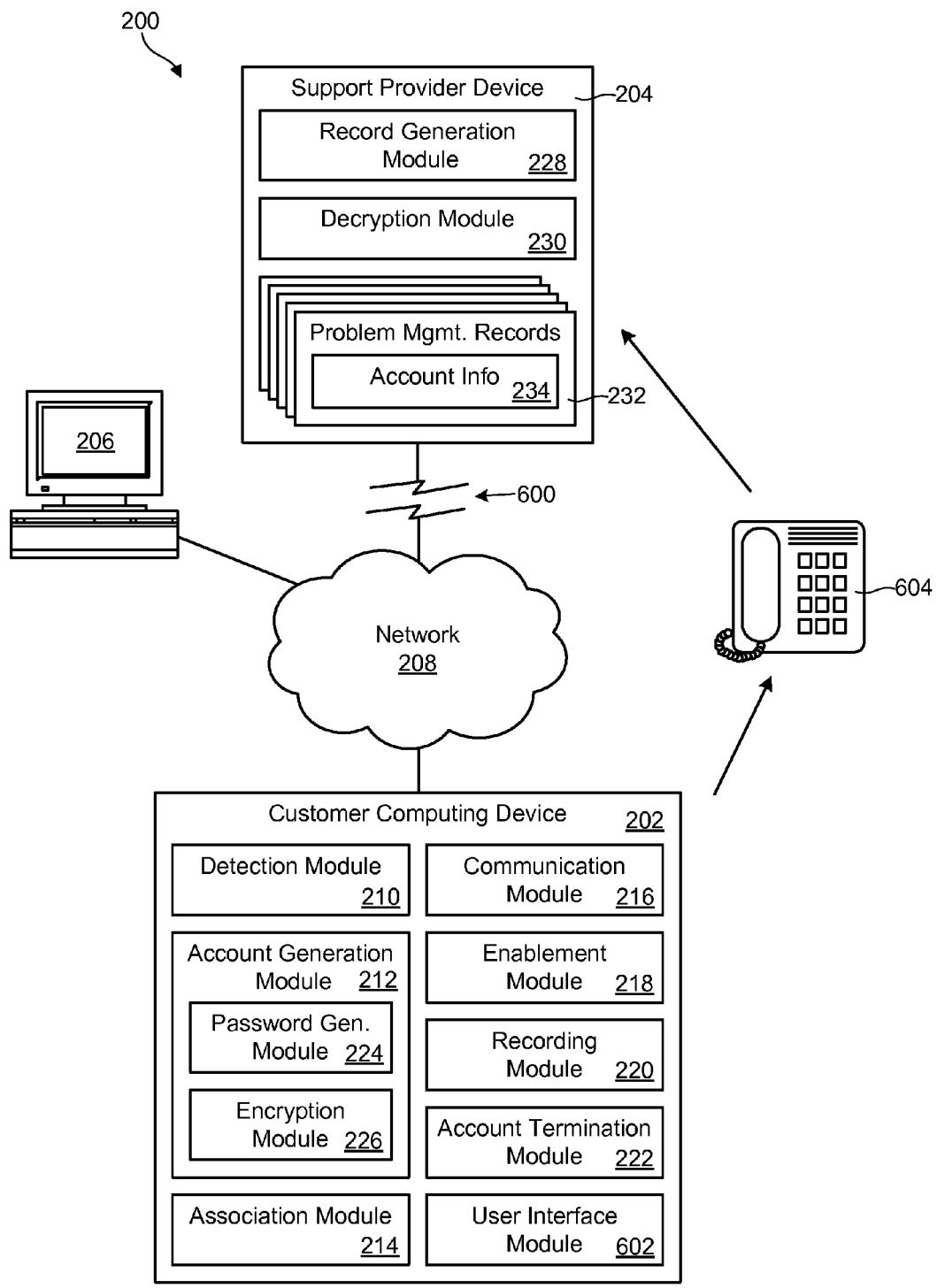
FIG. 6 is a high-level block diagram of an embodiment of a system for providing problem-based access to a computing device where communication is interrupted between the computing device and a support provider.

Referring to FIG. 6, an alternative embodiment of a system 200 for providing problem-based access to a computing device is illustrated. In this embodiment, a customer computing device 202 includes a user interface module 602 in addition to the other modules previously discussed. The user interface module 602 may be used in situations where the computing device 202 is not able to communicate with the support provider 204, such as where a break 600 or interruption 600 occurs. In such a case, the user interface module 602 may provide a user interface to allow a user to manually generate and/or determine a user account and password for a problem occurring on the computing device 202.

Using alternative means of communication, such as using a telephone 604 or other device 604, the user could then contact the support provider 204. The support provider 204 could then create a problem management record 232 for the problem. The user account info and password could be communicated to the support provider 204 at this time for inclusion in the problem management record 232. The problem management record 232 could then be assigned to a technician 206 so that service can be provided to fix the problem. If communication is possible, the technician may attempt to fix the problem remotely. If communication is not possible, the technician may visit the site of the computing device 202 to resolve the problem.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to provide problem-based access to a computing device, the method comprising:
    detecting, by a computing device, a problem on the computing device;
    automatically generating, by the computing device, a user account on the computing device in response to detecting the problem;
    tying the problem to the user account; and
    notifying, by the computing device, a support provider of the problem and the user account, thereby allowing the user account to be assigned to a service technician to enable the service technician to log into the computing device and address the problem.

2. The method of claim of claim 1, wherein tying the problem to the user account comprises uniquely tying the problem to the user account.

3. The method of claim 1, wherein automatically generating a user account further comprises generating a password for the user account.

4. The method of claim 3, wherein generating a password further comprises encrypting the password.

5. The method of claim 3, wherein notifying the support provider of the user account further comprises sending the password to the support provider.

6. The method of claim 1, further comprising closing the user account once the problem is resolved.

7. The method of claim 1, further comprising recording, in the user account, actions taken to address the problem.

8. The method of claim 1, further comprising replicating the user account to at least one device that interacts with the computing device.

9. The method of claim 1, further comprising enabling remote management capabilities for the computing device upon creating the user account.

10. A computer program product to provide problem-based access to a computing device, the computer program product comprising a non-transitory computer-readable storage medium having computer-usable program code embodied therein, the computer-usable program code comprising:
    computer-usable program code to detect, by a computing device, a problem on the computing device;
    computer-usable program code to automatically generate, by the computing device, a user account on the computing device in response to detecting the problem;
    computer-usable program code to tie the problem to the user account; and
    computer-usable program code to notify, by the computing device, a support provider of the problem and the user account created to address the problem.

11. The computer program product of claim 10, wherein tying the problem to the user account comprises uniquely tying the problem to the user account.

12. The computer program product of claim 10, wherein automatically generating a user account further comprises generating a password for the user account.

13. The computer program product of claim 12, wherein generating a password further comprises encrypting the password.

14. The computer program product of claim 12, wherein notifying the support provider of the user account further comprises sending the password to the support provider.

15. The computer program product of claim 10, further comprising computer-usable program code to close the user account when the problem is resolved.

16. The computer program product of claim 10, further comprising computer-usable program code to record, in the user account, actions taken to address the problem.

17. The computer program product of claim 10, further comprising computer-usable program code to replicate the user account to at least one device that interacts with the computing device.

18. The computer program product of claim 10, further comprising computer-usable program code to enable remote management capabilities for the computing device upon creating the user account.

19. An apparatus comprising:
a computing device comprising a plurality of modules implemented in at least one of hardware and software operating hardware, the plurality of modules comprising
a detection module to detect a problem on the computing device;
an account generation module to automatically generate a user account on the computing device in response to detecting the problem;
an association module to uniquely tie the problem to the user account; and
a communication module to notify a support provider of the problem and the user account created to address the problem.

20. The apparatus of claim 19, wherein the account generation module is further configured to generate a password for the user account, and the communication module is configured to send the password to the support provider.

21. The apparatus of claim 20, further comprising an encryption module to encrypt the password.

22. The apparatus of claim 19, further comprising an account termination module to close the user account once the problem is resolved.

23. The apparatus of claim 19, further comprising a recording module to record, in the user account, actions taken to address the problem.

24. The apparatus of claim 19, further comprising a replication module to replicate the user account to at least one device that interacts with the computing device.

25. The apparatus of claim 19, further comprising an enablement module to enable remote management capabilities for the computing device upon creating the user account.

* * * * *